3,412,057
POLYOLEFIN-ACETOGLYCERIDE COMPOSITIONS
HAVING REDUCED GAS PERMEABILITY
Shigeo Fujitani, Kanagawa-ken, Japan, assignor to Union
Carbide Corporation, a corporation of New York
No Drawing. Filed Mar. 10, 1965, Ser. No. 438,748
Claims priority, application Japan, Mar. 16, 1964,
39/14,487
10 Claims. (Cl. 260—23)

ABSTRACT OF THE DISCLOSURE

The gas permeability of films obtained from polyolefin compositions can be significantly decreased by incorporating in the polyolefin composition specific amounts of acetoglycerides of fat forming fatty acids or mixtures of monoacetoglycerides and diacetoglycerides of fat forming fatty acids.

---

This invention relates to improved polyolefin compositions and more particularly to polyolefin compositions exhibiting decreased gas permeability.

Self-supporting polyolefin films such as polyethylene and polypropylene films are characterized by low permeability to water vapor but high permeability as to other gases such as oxygen and carbon dioxide. Low water vapor permeability is of particular advantage in the packaging of moist foods with these films because the moisture content of the food is thereby substantially retained over long periods of time. High gas permeability for such gases as carbon dioxide and particularly oxygen, however, is quite disadvantageous for certain packaging applications. For example, high oxygen permeability enhances rancidity and mold growth and decreases the shelf life of many products such as nuts, bread, cheese and the like. Moreover, high gas permeability is also deleterious for applications wherein flavor and aroma result from the presence of highly volatile materials, i.e., where essences must be retained and oxidation retarded, for example, the packaging of coffee and exotic spices. Heretofore, polyolefins were limited as to their overall acceptance for packaging applications due to the above deficiencies. It was necessary therefore to decrease gas permeability. This was previously accomplished by coating polyolefin films with polyvinylidene chloride, rubber hydrochloride, cellophane and other similar relatively impervious materials; this, however, has proven relatively expensive and thus polyolefin films have still not been able to enjoy wide acceptance for packaging applications.

Accordingly, it is an object of the present invention to decrease gas permeability in polyolefin films.

It is another object of the present invention to provide melt-extrudable, polyolefin compositions, heat-formable into clear, self-supporting film, and particularly characterized by their decreased gas permeability.

It has now been found that the incorporation of specific amounts of acetoglycerides of fat-forming fatty acids or mixtures of monoacetoglycerides and diacetoglycerides of fat-forming fatty acids in a film-forming polyolefin composition is unexpectedly effective in reducing gas permeability of films formed from such compositions.

The term "fat-forming fatty acids" as used herein, is definitive of those fatty acids present as such or as glycerides in natural fats. The Yearbook of Agriculture, 1959 Food, U.S. Department of Agriculture, page 716, defines "fat" as follows: "A glyceryl ester of fatty acids. Fats generally are substances of plant and animal origin. Fat may be in solid form, as butter, margarine or other shortenings, or in liquid form, as the vegetable oils."

The monoacetoglycerides and diacetoglycerides useful in the practice of this invention can be prepared by known procedures, as for example, by the hydrolysis, of natural fats or oils, these being essentially mixtures of various fatty acid triglycerides, followed by conversion to the respective acetoglycerides by acetylation with acetic anhydride, acetyl chloride or the like. Upon hydrolysis of such oils or fats, there is usually obtained a complex mixture of alpha and beta monoglycerides, diglycerides, traces of triglcerides and free fatty acids. After acetylation, the components of such mixtures can be separated by suitable distillation procedures.

Illustrative examples of monoacetoglycerides, diacetoglycerides and mixtures thereof effective for the purposes of this invention are those obtained by the glycerolysis and acetylation of such fats or oils as beef tallow, mutton tallow, butter fat, coconut oil, corn oil, cotton seed oil, lard oil, olive oil, peanut oil, soy bean oil, sesame oil and from their partial or fully hydrogenated derivatives. More specifically, acetoglycerides such as monoacetoglyceryl monostearate, diacetoglyceryl monostearate, monoaceto-glyceryl distearate, monoacetoglyceryl monopalmitate, monoaceto-glyceryl dipalmitate, diacetoglyceryl monopalmitate, monoacetoglyceryl mono-oleate, and the like, as well as mixed fatty acids glycerides such as 1-aceto, 2-stearo-glyceryl monooleate, 1-aceto, 2-stearo-glyceryl monopalmitate and the like are considered effective for the purposes of this invention.

The incorporation of the acetoglycerides in polyolefin materials to reduce gas permeability can be accomplished in several ways. In a preferred embodiment, the acetoglyceride is homogeneously incorporated into the polyolefin by heating them together to at least the melting point of the plastic material in a suitable mixing apparatus, such as a Banbury mixer or heated differential mixing rolls until a homogeneous mixture is formed, solidifying the mixture by cooling and then comminuting the cooled mixture to a particle size satisfactory for hot melt extrusion or equivalent heat shaping operation to form films. It will be obvious to one skilled in the art that other methods can also be employed to incorporate the acetoglycerides of the present invention.

Film-forming polyolefins suitable for the present invention are particularly exemplified by polyethylene, polypropylene, polystyrene, copolymers of ethylene and propylene, polymers obtained from ethylene or propylene copolymerized with minimal amounts of other olefinic monomers such as butene, isobutylene, acrylic acids, esters of acrylic acids, styrene or combinations thereof.

The acetoglycerides of the present invention are incorporated in the above-described film-forming polyolefins in an amount which effectively reduces gas permeability and not more than that which does not appear to further reduce the gas permeability of the composition and/or not more than that which adversely affects the other normally desired physical characteristics of the polyolefin films produced therefrom. It has been found that incorporation of from about 0.05 to about 5 percent by weight of acetoglyceride into the film-forming polyolefin composition is effective in reducing gas permeability in the resulting film. No appreciable lowering of gas permeability is obtained when an acetoglyceride in amounts less than about 0.05 percent by weight is employed. Quite surprisingly, it was found that incorporation of more than about 5 percent by weight of an acetoglyceride increased the gas permeability and hence, is considered deleterious for the purposes of the present invention. It is considered more preferable, however, to incorporate the acetoglyceride in amounts of from about 0.5 to about 1.0 percent by weight into said polyolefin composition. Optimumly, the concentration of acetoglyceride in the film will vary with the thickness of the film. Since thinner films have a greater surface area per unit weight of film than do thicker films, a greater concentration of acetoglyceride will be necessary to produce optimum results in thinner films than is necessary for thicker films. The optimum concentration within the above-defined range can be readily determined for each particular thickness of the film by simple empirical tests.

The normally added materials, such as fillers, stabilizers, plasticizers, colorants, slip agents, anti-blocking Table I and film about 2 mils in thickness is then formed by conventional blown-tube methods. The tubular film is slit to form sheeting and the properties are determined as indicated below. As a control, the same polyethylene used in preparing these film compositions, but without the acetoglyceride added, is melt extruded by the same method.

TABLE I

| Example | Composition (percent wt.) | | Gas Permeability [1] (g./m.$^2$/24 hr./atm.) | | Tensile [2] Strength, kg./cm.$^2$ | Elongation,[3] percent |
|---|---|---|---|---|---|---|
| | Polyethylene | Acetoglyceride | Oxygen | Carbon dioxide | | |
| 1 (Control) | 100 | | 13 | 75 | 150 | 500 |
| 2 | 99.9 | 0.1 | 11 | 50 | 150 | 500 |
| 3 | 99.5 | 0.5 | 8 | 36 | 150 | 500 |

Test Method.—[1] ASTM D 1434–58. [2] ASTM D 882. [3] ASTM D 882.

agents, anti-static, anti-fog, antioxidant and like additives can be added to the compositions of this invention, provided, however, they are present in minimal amounts which will not offset the decreased gas permeability obtained by the present invention.

The improved polyolefin compositions of this invention can be extruded into self-sustaining films or can be coated onto base films by any of the methods known to the art. Preferably, however, when seamless tubing is desired, the compositions are extruded by the blown-tube method disclosed in U.S.P. 2,461,975 to Fuller and U.S.P. 2,461,976 to Schenk. These methods comprise, in general, melt extruding the thermoplastic composition through an annular die in the form of a seamless tubing, drawing the tubing from the die, and thereafter cooling, flattening and winding the tubing on reels. A bubble of a gaseous medium is maintained within the tubing between the annular die and the flattening means to distend the tubing to the desired diameter. Sheeting can be made from the tubing by cutting either one or both of the longitudinal edges.

The resulting polyolefin films are transparent and can be biaxially oriented by any methods known to the art. Also these films can be printed upon satisfactorily after suitable treatment of said film by methods known in the art, such as by subjecting the film to the action of corona discharge, flame treatment, chlorination, etc. Furthermore, such films can be heat sealed.

The following examples serve to further illustrate the invention, but are not to be construed in limitation thereof.

Examples I–III

Table I presented hereinbelow illustrates the decrease in gas permeability which can be obtained through practice of the present invention. It can be seen that gas permeability can be decreased without adversely affecting other normally desirable properties.

In the examples shown below, the polyethylene compositions are obtained by placing polyethylene on a differential two roll mill having a roll temperature of about 25° F. The ratio of the roll speeds is about 1.4 to 1 with the slower roll turning at about 20 r.p.m. The polyolefin is heated until softened and one part of a commercially available acetoglyceride, in this instance monoacetoglyceryl monostearate, is added thereto, said acetoglyceride having the following description:

Acid value _____ mg. KOH/gram fat__ 3
Saponification value _____ do____ 315
Acetyl value _____ do____ 13
Melting point _____ ° C__ 42

The polyethylene and the above-described acetoglyceride are milled together on the heated differential two roll mill for about 30 minutes until a homogeneous mixture is obtained. The resulting composition is removed from the mill, cooled, and cut to suitable particle size for melt extrusion. This composition is blended with additional polyethylene to the concentrations indicated in Example IV–VII In substantially the same manner as described in Examples I–III, diacetoglyceryl monostearate, monoaceto glyceryl dipalmitate, 1-aceto, 2-stearo glyceryl monooleate, mixtures of monoacetoglyceryl monostearate and monoacetoglyceryl monopalmitate are incorporated in polypropylene. The resulting polypropylene compositions when formed into films exhibit decreased gas permeability.

Thus the foregoing clearly demonstrates that the incorporation of specific amounts of the acetoglycerides herein described in polyolefins reduces the gas permeability of the film formed from said compositions. In addition, the acetoglycerides of the present invention do not adversely affect the transparency of said films. Accordingly, these polyolefin films are admirably suited for packaging applications wherein oxidation must be retarded and the presence of highly volatile materials which have pronounced effects on flavor and aroma retained.

What is claimed is:

1. A film-forming composition consisting essentially of a homogeneous mixture of a polyolefin and an acetoglyceride of a fat-forming fatty acid, said acetoglyceride being present in an amount imparting a decrease in gas permeability and less than that imparting an increase in gas permeability to a polyolefin film formed from said film-forming composition.

2. A film-forming composition consisting essentially of a homogeneous mixture of a polyolefin and a member selected from the group consisting of monoacetoglycerides of fat-forming fatty acids, diacetoglycerides of fat-forming fatty acids and mixtures thereof, said acetoglyceride being present in an amount imparting a decrease in gas permeability and less than that imparting an increase in gas permeability to a polyolefin film formed from said film-forming composition.

3. A film-forming composition consisting essentially of a homogeneous mixture of a polyolefin and an acetoglyceride selected from the group consisting of monoacetoglycerides of fat-forming fatty acids, diacetoglycerides of fat-forming fatty acids, and mixtures thereof, said acetoglyceride being present in amounts of from about 0.05 to about 5 percent by weight of said film-forming composition.

4. A film-forming composition as defined in claim 3 wherein said polyolefin is polyethylene.

5. A film-forming composition as defined in claim 3 wherein said polyolefin is polypropylene.

6. A film-forming composition as defined in claim 3 wherein the acetoglyceride is present in amounts of from about 0.5 to about 1.0 percent by weight of said film-forming composition.

7. A transparent polyolefin film obtained from a mixture consisting essentially of a polyolefin and an acetoglyceride homogeneously dispersed therein, said acetoglyceride being present in an amount imparting a decrease in gas permeability and less than that imparting an increase in gas permeability to said film.

8. A transparent self-supporting polyolefin film obtained from a mixture consisting essentially of a polyolefin having homogeneously dispersed therein an acetoglyceride selected from the group consisting of monoacetoglycerides of fat-forming fatty acids, diacetoglycerides of fat-forming fatty acids and mixtures thereof, said acetoglyceride being present in amounts of from about 0.05 to about 5 percent by weight of said film.

9. A transparent self-supporting polyolefin film as defined in claim 8 wherein the polyolefin is polyethylene.

10. A transparent self-supporting polyolefin film as defined in claim 8 wherein the polyolefin is polypropylene.

References Cited

UNITED STATES PATENTS

| | | | |
|---|---|---|---|
| 3,165,492 | 1/1965 | Tholstrup et al. | 260—32.6 |
| 3,247,142 | 4/1966 | Brunson et al. | 260—23 |

DONALD E. CZAJA, *Primary Examiner.*

R. A. WHITE, *Assistant Examiner.*